July 11, 1944.  E. C. HATCHER  2,353,562
CABLE TENSIONING AND RELEASING MEANS
Filed Sept. 1, 1942    3 Sheets-Sheet 1
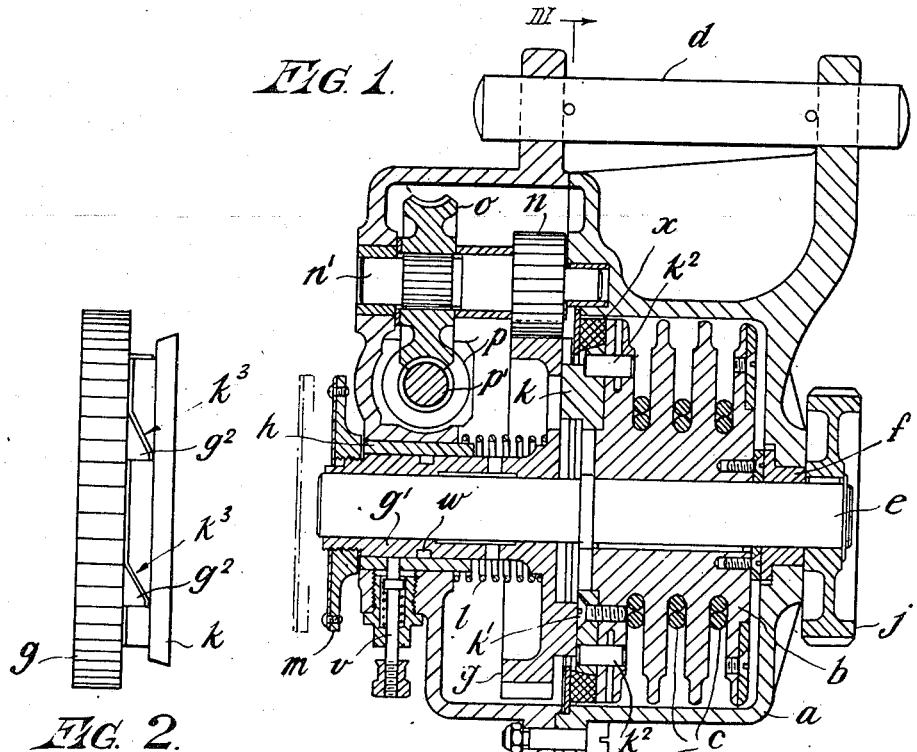
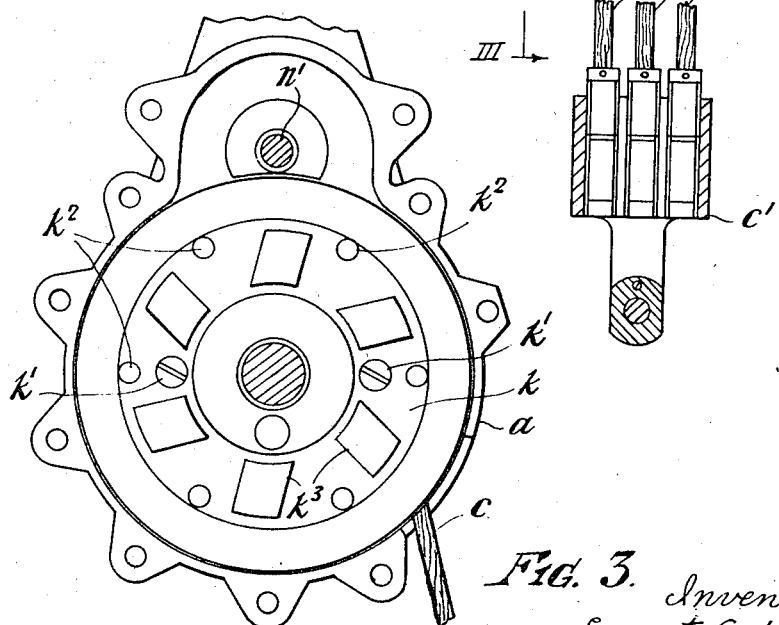
Fig. 3. Inventor
Ernest C. Hatcher,
by Sommers & Young
Attorneys July 11, 1944. E. C. HATCHER 2,353,562
CABLE TENSIONING AND RELEASING MEANS
Filed Sept. 1, 1942 3 Sheets-Sheet 2

Inventor
Ernest C. Hatcher,
by Sommers & Young
Attorneys

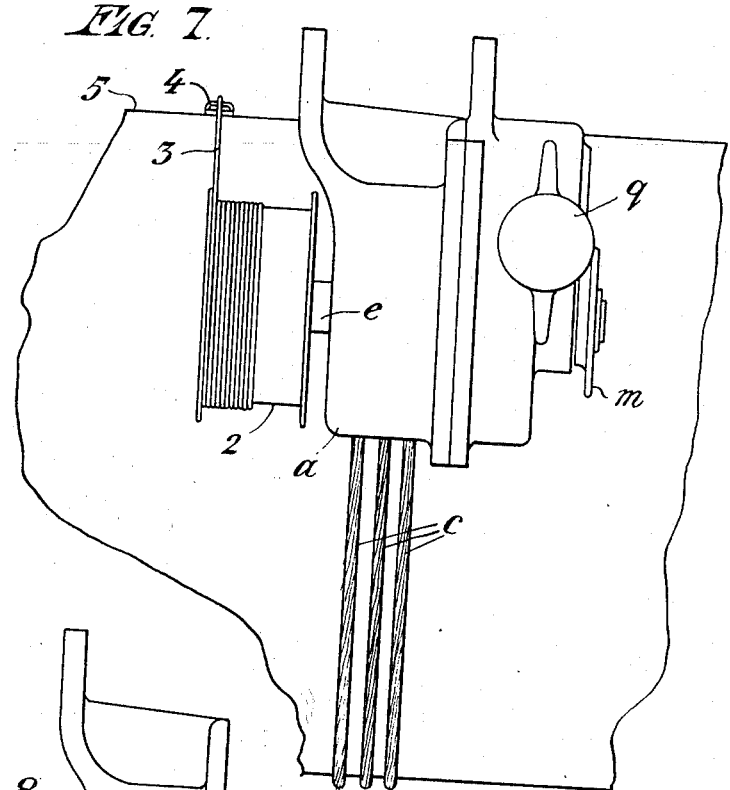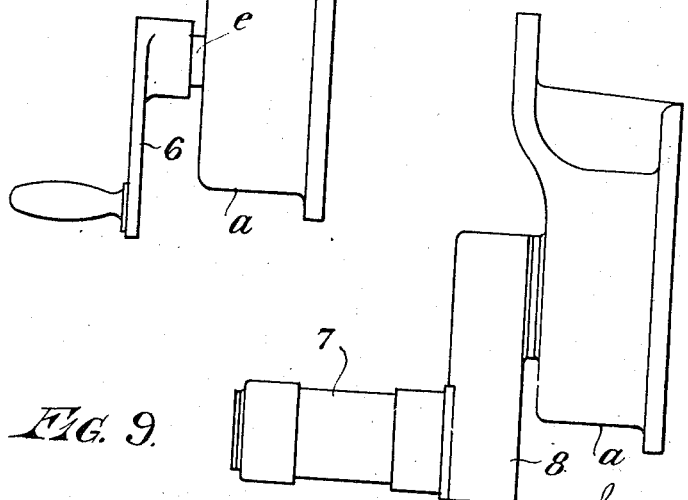

Patented July 11, 1944

2,353,562

UNITED STATES PATENT OFFICE 2,353,562

CABLE TENSIONING AND RELEASING MEANS

Ernest Charles Hatcher, Northwood, England, assignor to J. Stone & Company Limited, Deptford, England, a company of Great Britain Application September 1, 1942, Serial No. 456,938
In Great Britain August 15, 1941

3 Claims. (Cl. 254—187)

This invention relates to a winch for use in connection with bomb slings on aircraft.

One object of the invention is to provide an improved mechanism of the kind described and claimed in the specification of my U. S. A. patent application, Serial No. 399,537, filed June 24, 1941, now Patent No. 2,342,271, dated February 22, 1944, whereby the said mechanism may be readily operated for the winding in of the cables or tapes forming the sling after the latter has been released at its free end for the discharge of a bomb.

A further object is to provide an improved and simplified mechanical advantage gearing and one-way clutch device embodied in the said mechanism for the tensioning of a sling when wrapped around a bomb.

Yet another object is to provide simple but effective means adapted for preventing overstrain of the sling when the tension is applied thereto by operation of the mechanical advantage gearing.

In order to enable the invention to be readily understood, reference is made to the accompanying drawings, wherein:

Figure 1 is a slightly irregular longitudinal section through apparatus comprising a winding drum with worm gear tensioning means, a releasable ratchet clutch and a hand wheel for winding in cables used for forming a bomb sling.

Figure 2 is an edge view of a gear wheel and clutch disc seen in Figure 1.

Figure 3 is a cross section on the line III—III of Figure 1, the clutch disc being seen in face view in this figure.

Figure 7 is an elevation illustrating an automatically operating winch for driving the winding drum for winding in the cable.

Figure 8 is an elevation illustrating a crank handle for driving the winding drum for winding in the cable, and Figure 9 is an elevation illustrating an electric motor for driving the winding drum for winding in the cable.

Figure 4:
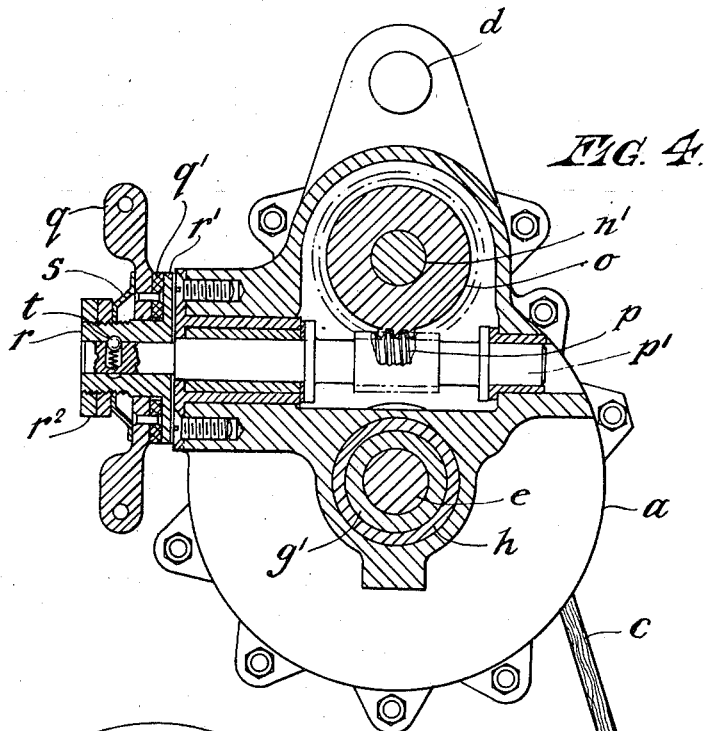
Figure 4 is a cross sectional elevation as seen from the left hand side of Figure 1.

Referring to Figures 1, 2 and 4, $a$ is the casing of a winding drum $b$ which is formed with a number, three in the example illustrated, of deep grooves for the winding of three cables $c$ to be used for forming a bomb-sling. The casing $a$ is adapted for being suspended by the pivot pin $d$ from an aircraft. The ends of the cables $c$ are connected with an eye device $c^1$ which is engaged in known manner with a releasable catch device on the aircraft when the cables $c$ have been drawn out from the drum $b$ and passed around a bomb to form a sling. The drum $b$ is keyed to a shaft $e$ which at one end is supported in a bearing $f$ in one side wall of the casing and at its other end has a bearing in a hub-sleeve $g^1$ of a large gear wheel $g$. The sleeve $g^1$ runs in a bearing bush $h$ in the other side wall of the casing $a$.

At the right hand side of Figure 1, the end of the shaft $e$ extends beyond the side wall of the casing $a$ and has keyed to it a hand wheel $j$ which is to be used for turning the drum $b$ to wind in the cable $c$, as hereinafter described. To the left hand side of the drum $b$ there is attached a clutch ring $k$ which is seen in face view in Figure 3 and in edge view in Figure 2. This clutch ring is secured to the drum $b$ by screws $k^1$ and drivingly connected therewith by shear pins $k^2$ Figures 1 and 2. The clutch ring $k$ is formed with a circular series of recesses $k^3$ shaped to conform with ratchet form dogs $g^2$ on the gear wheel $g$. A compression spring $l$ operating between the left hand side wall or cover of the casing $a$ in Figure 1, constantly tends to press the gear wheel $g$ rightwardly so as to maintain it in one-way clutched engagement with the clutch ring $k$ on the drum. A hand wheel $m$ screwed on to an extended end portion of the hub sleeve $g^1$ can be pulled out to the position indicated in chain lines in Figure 1 for the purpose of moving the sleeve $g^1$ and gear wheel $g$ leftwardly and against the action of the spring $l$, to disengage the teeth $g^2$ from the clutch ring $k$.

The gear wheel $g$ meshes with a pinion $n$ keyed to a shaft $n^1$ mounted in bearings near the top of the casing $a$ and when the gear wheel $g$ is shifted for declutching as above described, its teeth slide along the teeth of the pinion $n$. On the shaft $n^1$ there is fixedly secured a worm wheel $o$ in mesh with a worm $p$ on a worm shaft $p^1$. As seen in Figure 4, the worm shaft $p^1$ is mounted in bearings in the casing and one end is extended beyond the casing to receive a hand wheel $q$.

In the particular example illustrated, the hand wheel $q$, Figure 4, is not keyed to the worm shaft $p^1$ but is put into driving engagement with it by torque-limiting means for a purpose to be explained. To the hand wheel $q$ there is riveted an annulus $q^1$ of gripping material which is pressed into frictional engagement with a flange $r^1$ of a sleeve $r$ by means of a spring plate $s$ acting between the wheel $q$ and nuts $r^2$ on the sleeve $r$. The latter is keyed to an extended end portion of the shaft $p^1$ by means of a spring-pressed ball $t$, the spring loading on the ball being given a predetermined value. When the wheel $q$ is operated, turning moment is imparted to the sleeve $r$ through the friction clutch constituted by the parts $q^1$ $r^1$, and from the sleeve $r$ to the shaft $p^1$ through the ball $t$. If excessive turning moment is applied, the ball $t$ overcomes the spring loading and slips from a recess in the sleeve $r$, thus limiting the torque that can be applied to the worm shaft $p^1$ and preventing overtensioning of the cables $c$ when the latter are formed into a sling and tightened in the manner hereinafter described.

Figure 5:
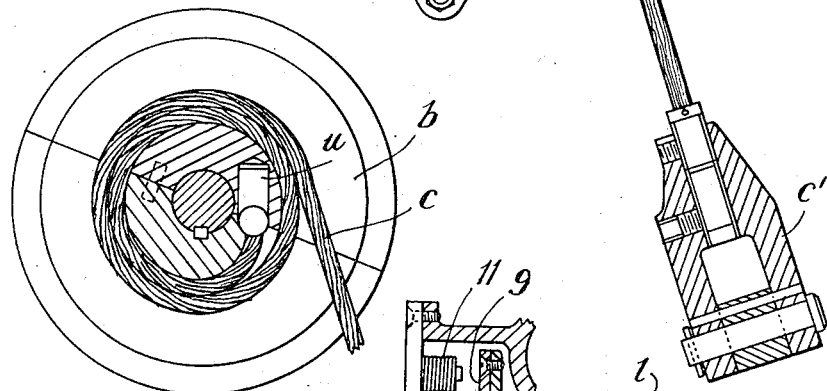
Figure 5 is a cross section through the winding drum.

As will be seen from Figure 5, the winding drum $b$ may be divided into halves, the removal of one half disclosing recesses in which cable anchoring means $u$ can be inserted. By replacing the said half and attaching it to the other half, the anchoring means $u$ becomes securely locked between the hub portions of the drum $b$.

In order to enable the cables $c$ to be drawn out to form a sling, the hand wheel $m$ is pulled outwards and to the left in Figure 1 against the action of the spring $l$. The sleeve $g^1$ and gear wheel $g$ are thus moved to the left so that the clutch dogs $g^2$ of the gear wheel are disengaged from the clutch ring $k$. The drum $b$ is then free to revolve when the cables $c$ are pulled out. The parts may be retained in this position for the time being by a spring-loaded pin $v$ mounted in the casing and adapted for entering a recess $w$ in the sleeve $g^1$ when the latter is pulled out. The sling having been formed, the pin $v$ is withdrawn from the recess $w$, whereupon the spring $l$ returns the gear wheel $g$ into clutching engagement with the clutch ring $k$. The sling now requires to be tightened around the bomb and this is done by turning the hand wheel $q$ which acts powerfully through the mechanical advantage gearing constituted by the worm and worm wheel gear $p$ $o$ and the pinion gears $n$ $g$. At the same time, and due to the torque-limiting means associated with the hand wheel $q$ as above described, it is not possible for the operator to apply excessive power such as might damage or break the cables $c$ or steel tapes forming the sling. The tension of the sling around the bomb cannot cause the cables $c$ to unwind and slacken because of the clutch and because the worm gear $o$ $p$ is irreversible. When the bomb is released and the sling falls free, the cables $c$ can be rewound on the drum $b$ by turning the hand wheel $j$. The drum $b$ can be turned easily in the winding-on direction, because the clutch ring $k$ clicks past the dogs $g^2$, the gear wheel $g$ being forced back against the action of its spring $l$ at each click.

The gearing compartment of the casing $a$ may be filled with lubricant which is prevented from entering the winding drum compartment by packing $x$, Figure 1.

The hand wheel $j$ for winding in the cables $c$ as described with reference to Figure 1, may be replaced by a winding drum 2 Figure 7. This drum 2 may be fixed directly on an extension of the shaft $e$, as shown, or it may be mounted on a shaft geared with the shaft $e$. On the drum 2 there is wound a cord 3 which is attached to an eye or device 4 on the top of a bomb, torpedo or the like 5 supported in the sling formed by the cables $c$. When the bomb 5 is released and falls away, the pull on the cord 3 revolves the auxiliary drum 2 and the drive thus imparted to the winding drum on which the cables $c$ are wound, causes the cables $c$ to be wound on to the drum within the casing $a$. The cord 3 would be arranged to pull off, or break or become detached from the drum 2 when fully unwound.

In Figure 8, a crank handle 6 is shown fitted to the shaft $e$ in place of the auxiliary winding drum 2 and the crank handle 6 would be operated in the same manner as the hand wheel $j$ described with reference to Figure 1.

In Figure 9, an electric motor 7 takes the place of the winding drum 2 in Figure 7 and is geared with the shaft $e$ through gearing in a box 8. In this case, the winding in of the sling, formed by the cables $c$ in Figure 7, would be effected by switching in the motor 7.

Figure 6:
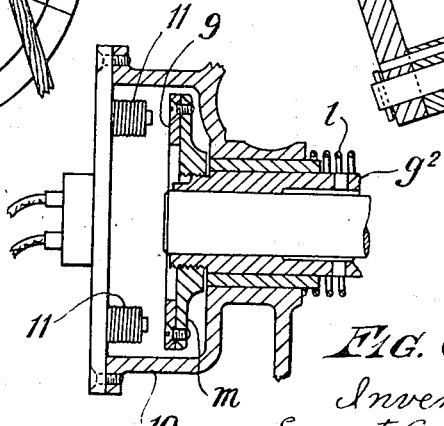
Figure 6 is a longitudinal sectional elevation illustrating magnetic clutch-releasing means which can be fitted in place of the manually operated clutch releasing means shown in Figure 1.

The clutch formed by the clutch ring $k$ and dogs $g^2$ on the gear wheel $g$, Figures 1 to 3, may be operated by power instead of by hand. For example, and as shown in Figure 6, the hand wheel $m$ screwed on to the hub sleeve $g^2$ of the wheel $g$ may be fitted with an annular armature 9 and on the interior of a casing part 10 enclosing the wheel $m$ there may be mounted an electromagnet or electromagnets 11. The clutch aforesaid can thus be opened by closing a switch for energizing the magnets 11 which then attract the armature 9 and shift the wheel $m$, and sleeve $g^2$ with its gear wheel and clutch dogs, against the action of the spring $l$. With such an arrangement, the locking pin $v$, described with reference to Figure 1, may be dispensed with.

I claim:

1. Bomb sling winch comprising in combination a compartmented casing, a drum revoluble in one compartment of said casing, externally accessible driving means in direct connection with the drum, a mechanical advantage gearing comprising worm and worm wheel elements disposed in another compartment of said casing, a one-way clutch normally operative between said gearing and one end of the drum, shifting means operable for disengaging said one-way clutch, packing means effective for preventing passage of lubricant from one compartment to the other, and externally accessible driving means in operative connection with the worm element of said mechanical advantage gearing.

2. In cable tensioning device, a casing, a shaft in said casing, a cable drum fixed on one portion of said shaft, a gear slidably mounted on said shaft adjacent one end of said drum, a one-way clutch intercalated between said drum and gear, said gear having axially extending teeth, a countershaft in said casing having a straight-toothed pinion engaging said gear, a worm gear fixed on said countershaft, a worm drivingly engaging said worm gear, spring means tensioning said clutch in engaging position, and manually operable means extending outwardly from the casing for sliding said gear on the shaft and releasing the clutch.

3. Bomb sling winch comprising in combination a casing, a drum shaft revolubly mounted therein, a winding drum fixedly mounted on said shaft, a bomb sling windable on said drum and having one end attached thereto, coupling means at the opposite and free end of said sling, driving means disposed externally of said drum, a worm operatively connected with said driving means, a worm wheel meshing with said worm, a pinion revoluble with said worm wheel, a gear wheel meshing with said pinion and revolubly and slidably mounted on one end of said shaft, co-operative ratchet clutch devices on adjacent faces of said gear wheel and said drum, said clutch devices being disengageable by sliding said gear wheel along said shaft, a spring operative against said wheel and constantly tending to engage said clutch devices, shifting means operable for sliding said gear wheel against the action of said spring, and manually operated driving means disposed externally of said casing on the opposite end of said shaft and in operative connection with said shaft.

ERNEST CHARLES HATCHER.